United States Patent
Natsume

(10) Patent No.: US 8,950,915 B2
(45) Date of Patent: Feb. 10, 2015

(54) VEHICLE LAMP

(71) Applicant: Kazunori Natsume, Shizuoka (JP)

(72) Inventor: Kazunori Natsume, Shizuoka (JP)

(73) Assignee: Koito Manufacturing Co., Ltd., Tokyo (JP)

( * ) Notice: Subject to any disclaimer, the term of this patent is extended or adjusted under 35 U.S.C. 154(b) by 0 days.

(21) Appl. No.: 13/761,626

(22) Filed: Feb. 7, 2013

(65) Prior Publication Data

US 2013/0201709 A1    Aug. 8, 2013

(30) Foreign Application Priority Data

Feb. 7, 2012    (JP) ................................. 2012-024473

(51) Int. Cl.
*F21V 9/00*     (2006.01)
*B60Q 1/00*     (2006.01)
*F21S 8/10*     (2006.01)

(52) U.S. Cl.
CPC .................. *B60Q 1/00* (2013.01); *F21S 48/215* (2013.01); *F21S 48/2237* (2013.01); *F21S 48/2268* (2013.01); *F21S 48/24* (2013.01); *F21S 48/234* (2013.01)
USPC ......................................... 362/511; 362/555

(58) Field of Classification Search
CPC .............. F21V 8/00; F21V 7/04; F21S 48/00; F21S 48/215; F21S 48/2237; F21S 48/1241; F21S 48/225; F21S 48/2268; F21S 48/234; F21S 48/24; B60Q 1/00
USPC .......... 362/511, 516–518, 560, 623–626, 555
See application file for complete search history.

(56) References Cited

U.S. PATENT DOCUMENTS

| 7,104,678 B2* | 9/2006 | De Lamberterie ............ 362/560 |
| 2004/0184286 A1 | 9/2004 | De Lamberterie |
| 2010/0008088 A1* | 1/2010 | Koizumi et al. .............. 362/235 |

(Continued)

FOREIGN PATENT DOCUMENTS

| CN | 101097049 A | 1/2008 |
| CN | 101625097 A | 1/2010 |

(Continued)

OTHER PUBLICATIONS

Espacenet, Patent Abstract for Japanese Publication No. 2004235153 published Aug. 19, 2004 (2 pages).
Office Action issued in corresponding Chinese Application No. 201310036372.5, mailed Sep. 29, 2014 (15 pages).

*Primary Examiner* — Jason Moon Han
(74) *Attorney, Agent, or Firm* — Osha Liang LLP

(57) ABSTRACT

A vehicle lamp includes a light guide extending in a first direction intersecting a front-rear direction of the lamp, a light source arranged to input light into the light guide from an end face of the light guide, and a reflector arranged behind the light guide to extend in the first direction. Reflecting elements on a rear surface portion of the light guide internally reflect the light toward a front surface portion of the light guide. The reflector has a first reflecting portion disposed behind the reflecting elements and a second reflecting portion disposed adjacent to the first reflecting portion in a second direction intersecting the first direction. The first reflecting portion reflects a portion of the light that has leaked rearward from the reflecting elements, and the second reflecting portion forwardly reflects the portion of the light that has been reflected by the first reflecting portion.

4 Claims, 5 Drawing Sheets

(56) References Cited

U.S. PATENT DOCUMENTS

2011/0242831 A1* 10/2011 Okui et al. .................... 362/511
2014/0036522 A1* 2/2014 Nakada ........................ 362/511

FOREIGN PATENT DOCUMENTS

| | | |
|---|---|---|
| CN | 201434303 Y | 3/2010 |
| JP | 2004-235153 A | 8/2004 |

* cited by examiner

VEHICLE LAMP

CROSS-REFERENCE TO RELATED APPLICATIONS

The present application claims priority from Japanese Patent Application No. 2012-024473 filed on Feb. 7, 2012, the entire content of which is incorporated herein by reference.

BACKGROUND OF INVENTION

1. Field of the Invention

The present invention relates to a vehicle lamp having a light guide and a reflector.

2. Related Art

A vehicle lamp may have a light guide extending in one direction intersecting the front-rear direction of the lamp, a light source arranged to input light into the light guide from the longitudinal end of the light guide, and a reflector disposed behind the light guide and extending in the same direction as the light guide.

For example, a related art vehicle lamp has a ring-shaped light guide having a circular cross section and extending in a direction perpendicular to the front-rear direction of the lamp (see, e.g., JP 2004-235153 A). This vehicle lamp has a reflector disposed behind the light source to forwardly reflect the light leaking rearward from reflecting elements on a rear surface portion of the light guide so as to cause the light to reenter the light guide and then exit the light guide from a front surface portion of the light guide.

According to the related art vehicle lamp described above, not only the light internally reflected by the reflecting elements, but also the light leaking rearward from the reflecting elements can be used effectively as irradiation light of the lamp.

However, as for the light reentering the light guide after leaking rearward from the light guide and being reflected by the reflector, it is difficult to control the direction in which the light exits from the front surface portion of the light guide with high accuracy.

SUMMARY OF INVENTION

One or more embodiments of the present invention provide a vehicle lamp having a light guide and a reflector, and configured to control light leaking rearward from reflecting elements on a rear surface portion of the light guide with high accuracy.

According to one or more embodiments of the present invention, a vehicle lamp is provided. The vehicle lamp includes a light guide arranged to extend in a first direction intersecting a front-rear direction of the lamp, a light source arranged to input light into the light guide from an end face of the light guide in the first direction, and a reflector arranged behind the light guide to extend in the first direction. The light guide has a plurality of reflecting elements on, a rear surface portion of the light guide. The reflecting elements are configured to internally reflect the light that has entered the light guide to output the light from a front surface portion of the light guide toward a front of the lamp. The reflector has a first reflecting portion disposed behind the reflecting elements and a second reflecting portion disposed adjacent to the first reflecting portion in a second direction intersecting the first direction. The first reflecting portion is configured to reflect a portion of the light that has leaked rearward from the reflecting elements toward the second reflecting portion, and the second reflecting portion is configured to reflect the portion of the light that has been reflected by the first reflecting portion toward the front of the lamp.

The first direction is not limited in so far as it intersects the front-rear direction of the lamp.

The sectional shape of the light guide and the configuration of the reflecting elements on the rear surface portion of the light guide are not limited in so far as the light guide is arranged to extend in the first direction.

Other aspects and advantages of the invention will be apparent from the following description, the drawings and the claims.

DETAILED DESCRIPTION

Hereinafter, embodiments of the present invention will be described in detail with reference to the drawings. In embodiments of the invention, numerous specific details are set forth in order to provide a more thorough understanding of the invention. However, it will be apparent to one of ordinary skill in the art that the invention may be practiced without these specific details. In other instances, well-known features have not been described in detail to avoid obscuring the invention.

Figure 1:
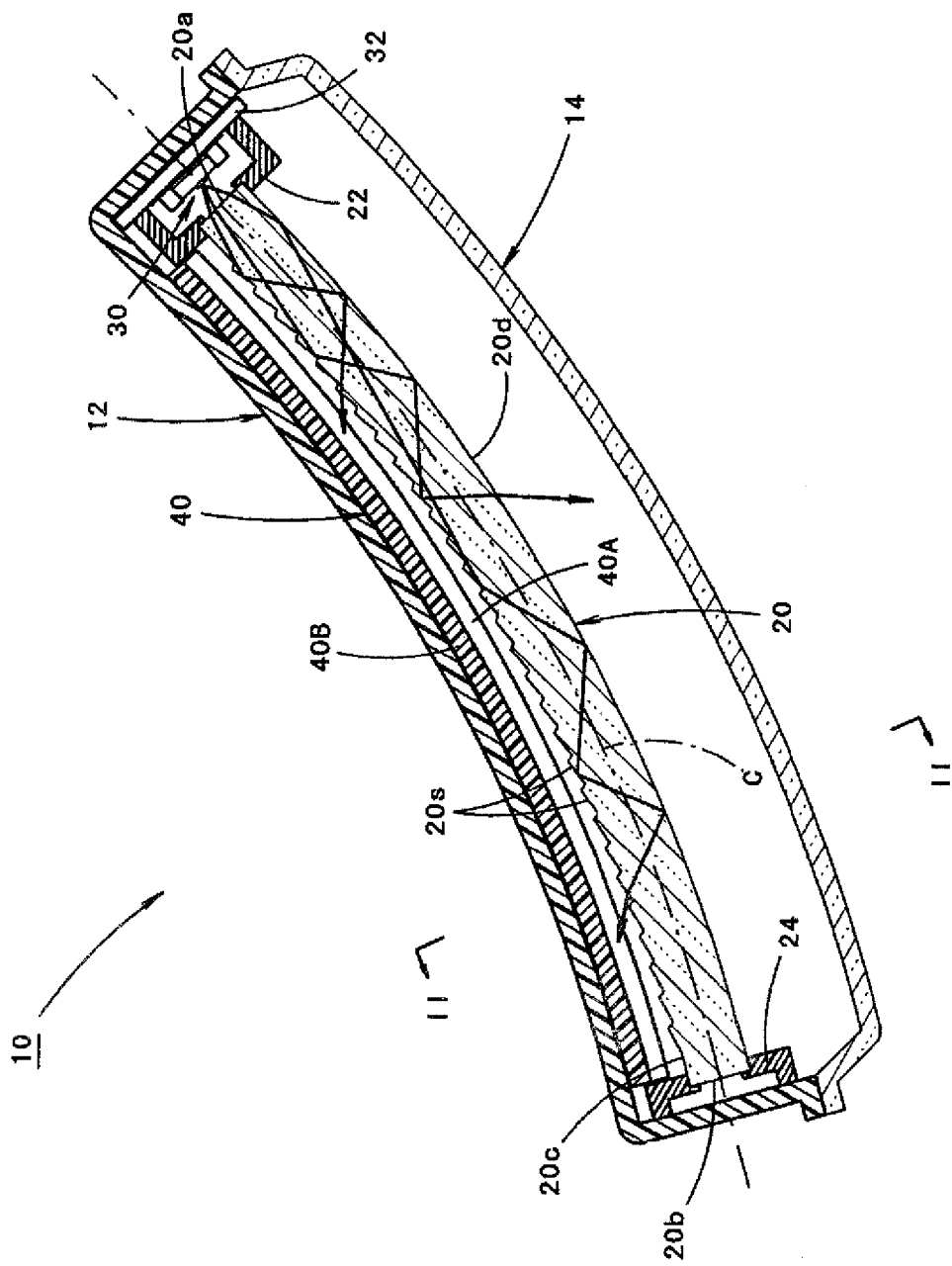
FIG. 1 is a horizontal sectional view of a vehicle lamp according to one or more embodiments of the present invention, taken along the line I-I in FIG. 2.
Figure 2:
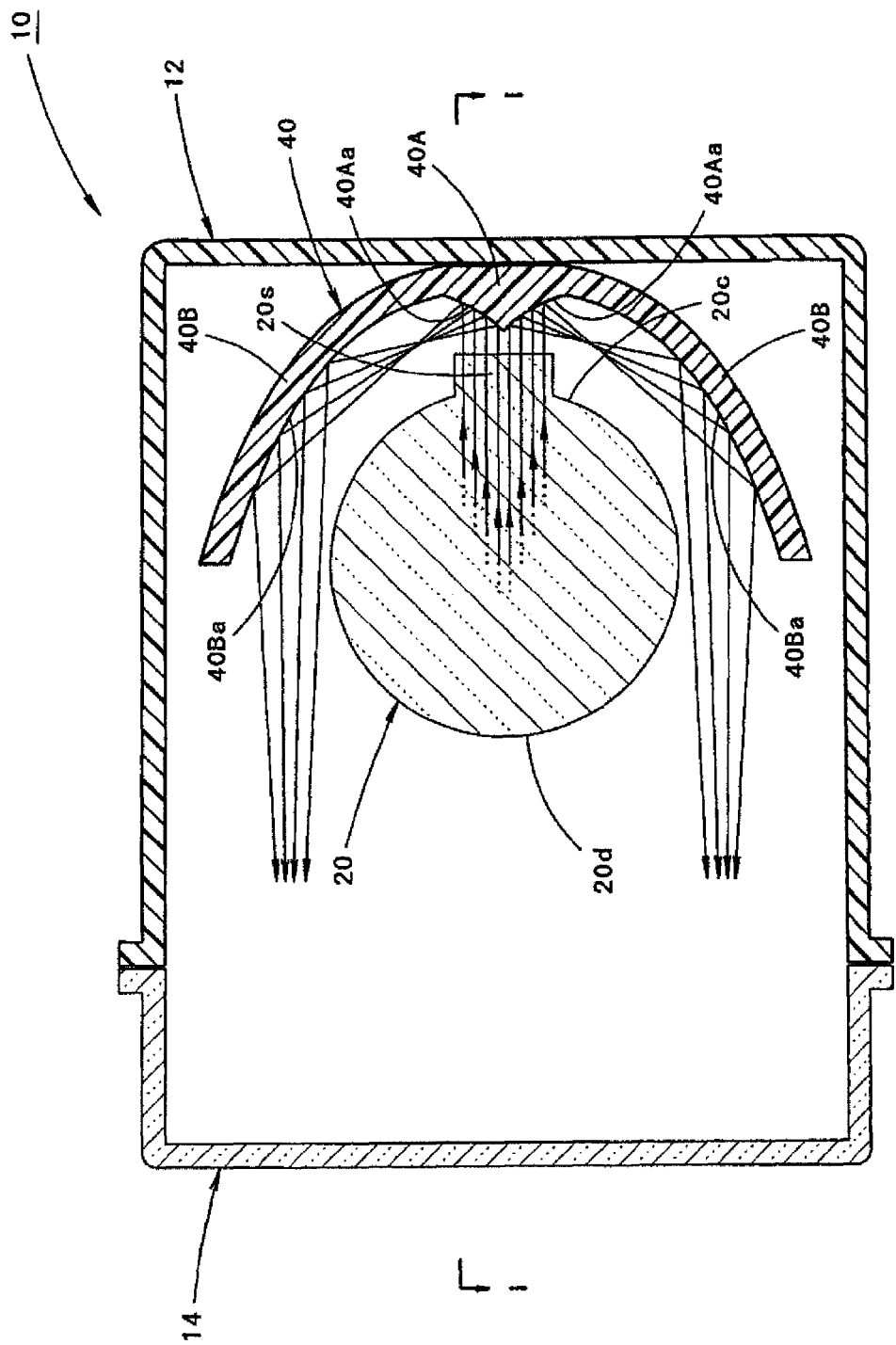
FIG. 2 is a sectional view of a vehicle lamp according to one or more embodiments of the present invention, taken along the line II-II in FIG. 1.

FIGS. 1 and 2 illustrate a vehicle lamp 10 according to one or more embodiments of the present invention. The vehicle lamp 10 is a tail lamp adapted to be provided on a right side of a rear end portion of a vehicle. As shown in FIGS. 1 and 2, the vehicle lamp 10 has a lamp body 12, a transparent cover 14 attached to a front opening portion of the lamp body 12, a light guide 20 arranged to extend in a curved manner in a vehicle width direction, a light source 30 arranged to input light into the light guide 20 from a right end face 20a of the light guide 20 which is located on an outer side in the vehicle width direction, and a reflector 40 arranged behind the light guide 20 to extend in a curved manner in the vehicle width direction. The light guide 20, the light source 30 and the reflector 40 are disposed inside a lamp chamber formed by the lamp body 12 and the transparent cover 14.

In the following description of the embodiments, terms defining a direction, such as "forward" and "rearward", are based on a front-rear direction of the vehicle lamp 10, which is not necessarily the same as a front-rear direction of a vehicle. That is, in the illustrated examples, the front-rear direction of the vehicle lamp 10 is substantially opposite to the front-rear direction of the vehicle on which the vehicle lamp 10 is mounted.

The light guide 20 is formed as a light guiding rod extending along a curve C toward the rear from its left end face 20b to its right end face 20a. The light guide 20 has a circular cross section. On a portion of a rear surface portion 20c of the light guide 20 other than the right and left end portions of the light guide 20, reflecting elements 20s are formed to protrude rearward. Each of the reflecting elements 20s is formed as a prism extending in the up-down direction, and has a wedge-shaped cross section having a step on the outer side in the vehicle width direction. The reflecting elements 20s are continuously provided in the vehicle width direction in a saw-tooth manner.

The light source 30 is, for example, a red light-emitting diode. The light source 30 is disposed near the right end face 20a of the light guide 20 such that the light emitting surface of the light source 30 faces the right end face 20a of the light guide 20. The light source 30 is secured to and supported by a light source support 32, and the light source support 32 is secured to and supported by the lamp body 12.

The right and left end portions of the light guide 20 are secured to and supported by respective light guide holders 22, 24. The light guide holder 22 supporting the right end portion of the light guide 20 is secured to and supported by the light source support 32, and the light guide holder 24 supporting the left end portion of the light guide 20 is secured to and supported by the lamp body 12.

The vehicle lamp 10 is configured such that the light emitted by the light source 30 enters the light guide 20 from the right end face 20a, and that the light that has entered the light guide 20 is then internally reflected by the reflecting elements 20s on the rear surface portion 20c due to total reflection, thereby causing the light to forwardly exit the light guide 20 from a front surface portion 20d of the light guide 20.

The light is partially internally reflected by the front surface portion 20d of the light guide 20 due to total reflection, instead of forwardly exiting the light guide 20 from the front surface portion 20d, toward the rear surface portion 20c of the light guide 20. A part of the light that has reached one of the reflecting elements 20s at an incident angle exceeding a critical angle is again internally reflected by the reflecting element 20s toward the left end face 20b, and another part of the light that has reached one of the reflecting elements 20s at an incident angle that is smaller than the critical angle leaks out of the light guide 20 from the reflecting element 20s toward the rear.

The reflector 40 is configured to reflect the light that has leaked rearward from the light guide 20 toward the front of the lamp.

Figure 3:
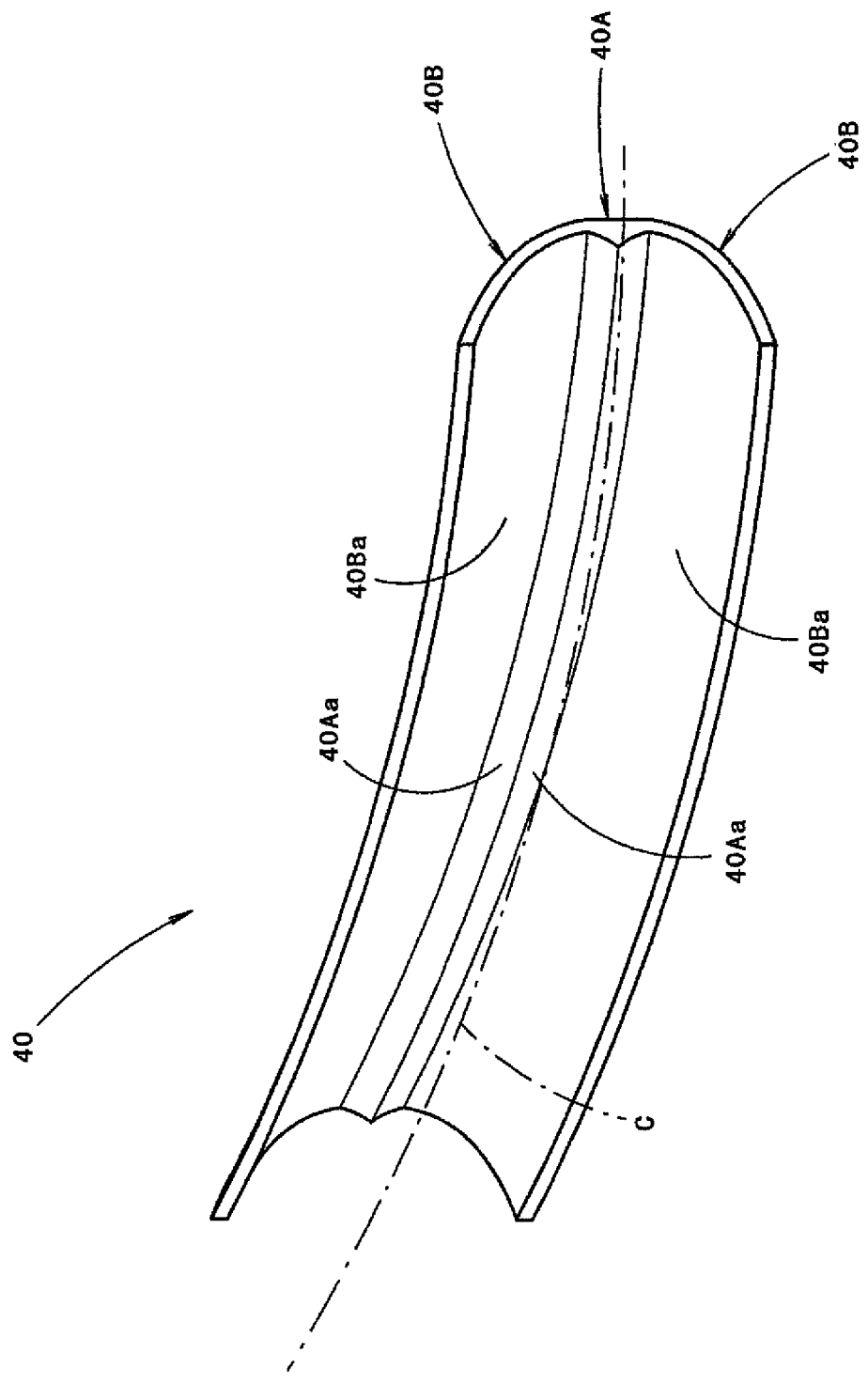
FIG. 3 is a perspective view of a reflector of a vehicle lamp according to one or more embodiments of the present invention.

FIG. 3 is a perspective view of the reflector 40. As shown in FIGS. 2 and 3, the reflector 40 has a semi-circular cross section that surrounds the rear part of the light guide 20, and is arranged to extend along the curve C and toward the rear as it extends toward the outer side in the vehicle width direction.

The reflector 40 has a first reflecting portion 40A located behind the reflecting elements 20s on the rear surface portion 20c of the light guide 20 and a pair of second reflecting portions 4013 disposed adjacent to the first reflecting portion 40A above and below the first reflecting portion 40A.

As shown in FIG. 2, the first reflecting portion 40A is configured to reflect the light that has leaked rearward from the reflecting elements 20s on the rear surface portion 20c of the light guide 20 toward the upper and lower second reflecting portions 40B. The second reflecting portions 40B are configured to reflect the light that has been reflected by the first reflecting portion 40A toward the front of the lamp through a space above and below the light guide 20.

The first reflecting portion 40A has upper and lower reflecting surfaces 40Aa configured based on, as reference surfaces, upper and lower lateral surfaces of a triangular prism extending along the curve C. Each of the reflecting surfaces 40Aa of the first reflecting portion 40A is configured to reflect the light that has leaked rearward from the reflecting elements 20s toward a reflecting surface 40Ba of the associated second reflecting portion 40B. Each of the reflecting surfaces 40Aa is formed as a substantially concave cylindrical surface so that, in a vertical plane, each of the reflecting surfaces 40Aa reflects the light that that has leaked rearward from the reflecting elements 20s forwardly and obliquely upward or downward such that the light is firstly converged and then diffused.

The reflecting surface 40Ba of each of the second reflecting portions 40B is configured to reflect the light that has been reflected by the first reflecting portion 40A toward the front of the lamp such that the light is moderately converged in the up-down direction.

According to the vehicle lamp 10 described above, the light guide 20 is disposed to extend in the vehicle width direction (i.e., in a first direction intersecting the front-rear direction of the lamp), the light source 30 is disposed to input light into the light guide 20 from the right end face 20a of the light guide 20 on an outer side in the vehicle width direction (i.e., an end face in the first direction), and the reflector 40 is disposed to extend in the vehicle width direction behind the light guide 20. The light guide 20 is configured such that the light that has been emitted from the light source 30 and entered the light guide 20 is internally reflected by the reflecting elements 20s on the rear surface portion 20c of the light guide 20 and is output toward the front of the lamp from the front surface portion 20d of the light guide 20. Consequently, in a front view of the lamp, the light guide 20 appears as it emits light.

Further, the reflector 40 has the first reflecting portion 40A located behind the reflecting elements 20s and the second reflecting portions 40B disposed adjacent to the first reflecting portion 40A above and below the first reflecting portion 40A (i.e., in a second direction intersecting the first direction). The first reflecting portion 40A is configured to reflect the light that has leak rearward from the reflecting elements 20s toward the second reflecting portions 40B, and the second reflecting portions 40B are configured to reflect the light that has been reflected by the first reflecting portion 40A toward the front of the lamp.

That is, the light that has leaked rearward from the light guide 20 is reflected toward the second reflecting portions 40B by the first reflecting portion 40A of the reflector 40 disposed behind the light guide 20, and then is reflected toward the front of the lamp by the second reflecting portions 40B. Therefore, the light that has leaked rearward from the light guide 20 can be used effectively as part of the irradiation light of the lamp. Further, because the light that has leaked rearward from the light guide 20 are reflected sequentially by the first reflecting portion 40A and the second reflecting portions 40B, the light can be output toward the front of the lamp without reentering the light guide 20. Therefore, the irradiation light can be controlled with high accuracy.

As described above, one or more embodiments of the present invention provide a vehicle lamp having a light guide 20 and a reflector 40, and configured to control light that has leaked rearward from reflecting elements 20s on a rear surface portion 20c of the light guide 20 with high accuracy.

Further, using the light that has leaked rearward from the light guide 20, the second reflecting portions 40B of the reflector 40 also appear as they emit light uniformly and together with the light guide 20 when viewed from the front of the lamp. This improves the appearance of the vehicle lamp 10.

Further, the first reflecting portion 40A of the reflector 40 has the reflecting surfaces 40Aa configured based on, as reference surfaces, lateral surfaces of the triangular prism extending in the first direction. Thus, the light can be reflected efficiently toward the reflecting surfaces 40Ba of the second reflecting portions 40B.

Further, the second reflecting portions 40B are disposed on each side of the first reflecting portion 40A above and below the first reflecting portion 40A. This makes it easier to control, with high accuracy, the light that has leaked rearward from the light guide 20, and also increases the apparent light emitting area which improves the appearance of the vehicle lamp 10.

The vehicle lamp 10 described above is configured as a tail lamp adapted to be mounted on a right side of a rear end portion of a vehicle. However, the present invention is also applicable to a left tail lamp or other vehicle lamps, including lamps adapted to be mounted on a front portion a vehicle, and the same or similar advantages can be provided by employing a similar configuration as the vehicle lamp 10 described above.

Figure 4:
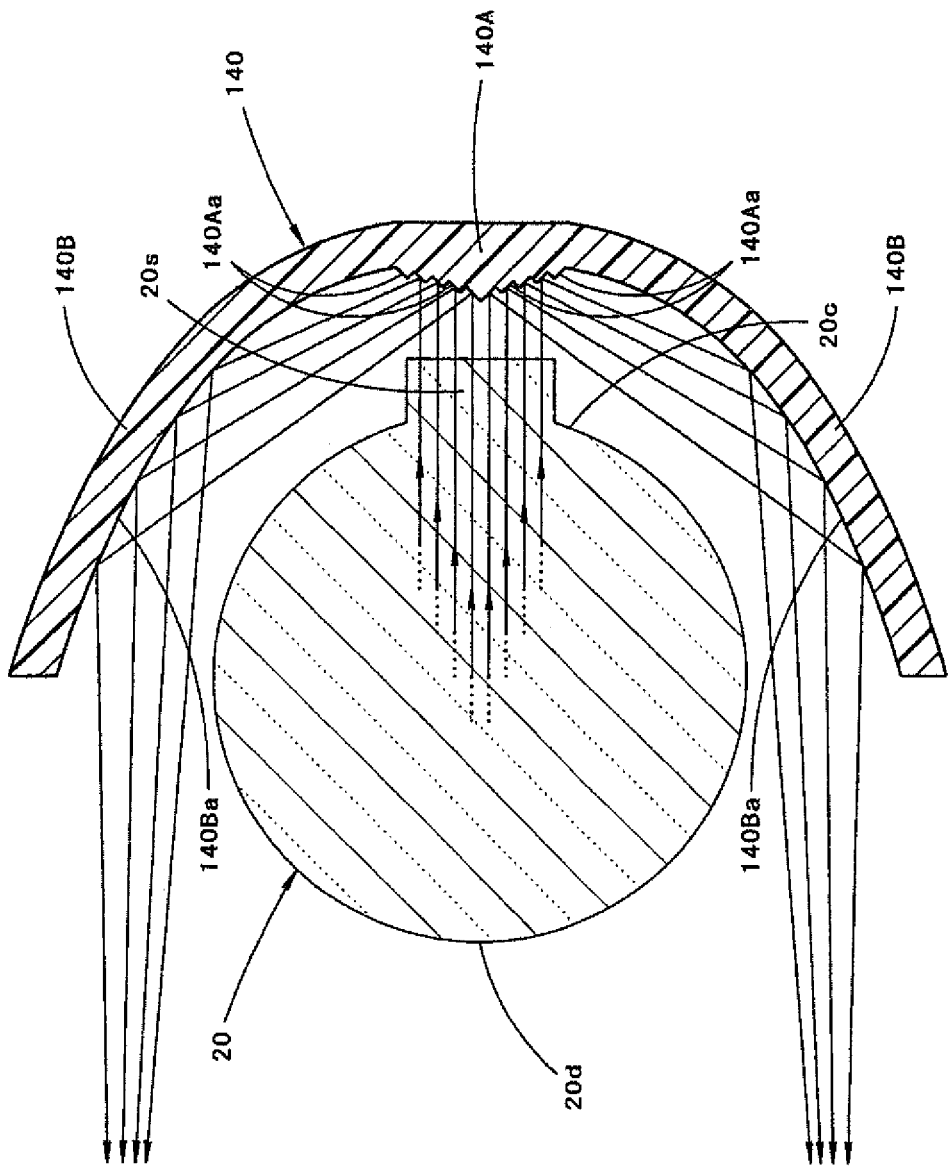
FIG. 4 is a sectional view of a portion of a vehicle lamp according to one or more embodiments of the present invention, taken along the line II-II in FIG. 1.

Next, examples of modifications of the vehicle lamp 10 will be described. FIG. 4 illustrates a portion of the vehicle lamp according to a first example.

As shown in FIG. 4, a reflector 140 of this example is different from the reflector 40 in that a first reflecting portion 140A of the reflector 140 has a plurality of reflecting surfaces 140Aa arranged side by side in the second direction.

The reflecting surfaces 140Aa are formed in a stepwise manner such that they are gradually stepped rearward as they become farther from the center of the first reflecting portion 140A in the up-down direction. The reflecting surfaces 140Aa on each side reflect the light that has leaked rearward from the reflecting elements 20s on the rear surface portion 20c of the light guide 20 forwardly and obliquely upward or downward such that the light is moderately diffused in a vertical plane.

Upper and lower second reflecting portions 140B are configured to reflect light reflected by the first reflecting portion 140A toward the front of the lamp through a space above and below the light guide 20. A reflecting surface 140B of each of the second reflecting portion 140B reflects the light that has been reflected by the first reflecting portion 140A toward front of the lamp such that the light is moderately converged in the up-down direction.

The reflecting elements 20s on the rear surface portion 20c of the light guide 20 are configured as prisms continuously formed in the vehicle width direction in a sawtooth structure, each of the prisms extending in the up-down direction and having a wedge-shaped cross section having a step on the outer side in the vehicle width direction. Through these reflecting elements 20s, the first reflecting portion 140A of the reflector 140 can be observed clearly. According to this example, the first reflecting portion 140A has the reflecting surfaces 140Aa arranged side by side in the up-down direction, which appear like horizontal stripes. This improves the design of the first reflecting portion 140A and the appearance of the vehicle lamp.

Figure 5:
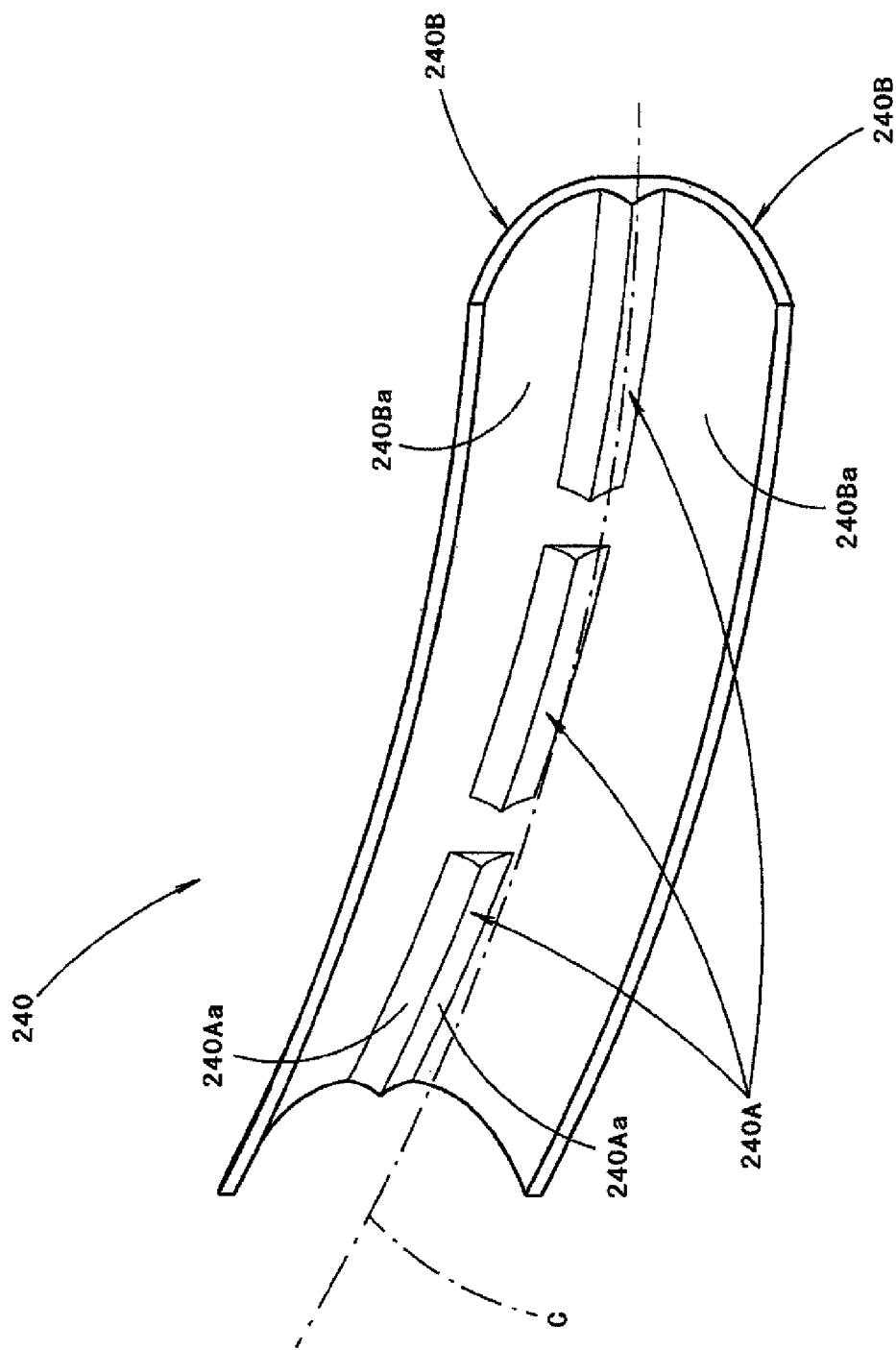
FIG. 5 is a perspective view of a reflector of a vehicle lamp according to one or more embodiments of the present invention.

FIG. 5 illustrates a reflector 240 of a vehicle lamp according to another example.

As shown in FIG. 5, the reflector 240 is different from the reflector 40 in that the reflecting portion 240A is provided is a discrete manner at three locations along the curve C extending in the vehicle width direction.

Reflecting surfaces 240Aa of each of the first reflecting portions 240A and reflecting surfaces 240Ba of the second reflecting portion 240B are similar to those of the reflector 40.

According to this example, in a front view of the lamp, the second reflecting portions 240B of the reflector 240 appear as they emit light uniformly at three locations in the vehicle width direction. This improves the appearance of the vehicle lamp by providing a different design.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A vehicle lamp comprising:
a light guide arranged to extend in a first direction intersecting a front-rear direction of the lamp;
a light source arranged to input light into the light guide from an end face of the light guide in the first direction; and
a reflector arranged behind the light guide to extend in the first direction,
wherein the light guide comprises a plurality of reflecting elements on a rear surface portion of the light guide, the reflecting elements being configured to internally reflect the light that has entered the light guide to output the light from a front surface portion of the light guide toward a front of the lamp,
wherein the reflector comprises a first reflecting portion disposed behind the reflecting elements and a second reflecting portion disposed adjacent to the first reflecting portion in a second direction intersecting the first direction; and
wherein the first reflecting portion is configured to reflect at least a portion of the light that has leaked rearward from the reflecting elements toward the second reflecting portion without entering the light guide and the second reflecting portion is configured to reflect the portion of the light that has been reflected by the first reflecting portion toward the front of the lamp.

2. The vehicle lamp according to claim 1, wherein the first reflecting portion comprises a reflecting surface configured based on, as a reference surface, a lateral surface of a triangular prism extending in the first direction.

3. The vehicle lamp according to claim 1, wherein the first reflecting portion comprises a plurality of reflecting surfaces arranged side by side in the second direction.

4. The vehicle lamp according to claim 1, wherein the second reflecting portion is disposed on each side of the first reflecting portion.

* * * * *